United States Patent Office 2,767,057
Patented Oct. 16, 1956

2,767,057

MANUFACTURE OF HYDRAZINE

Robert M. Kennedy, Newtown Square, Pa., assignor to Sun Oil Company, Philadelphia, Pa., a corporation of New Jersey Application December 16, 1954, Serial No. 475,767

8 Claims. (Cl. 23—190)

This invention relates to the manufacture of hydrazine, and it is specifically directed to an improved process for the preparation of hydrazine.

Hydrazine is becoming increasingly important as a rocket propellant and as an intermediate in the manufacture of various chemical products. Methods are known in the art for producing hydrazine from ammonia through the use of various reagents. Such methods, however, are generally unsatisfactory since they involve the formation of undesirable and difficultly separable by-products, poor product yields are obtained, and the procedures involve the use of expensive or corrosive reagents. Other prior art procedures are known whereby hydrazine is produced directly from ammonia by subjecting the ammonia to pyrolysis, photo-decomposition, electrical activation, or the like. In these latter procedures, however, it has generally been impossible to produce hydrazine in yields which are commercially feasible.

It is an object of this invention to provide an improved method for producing hydrazine. Other objects will be apparent hereinafter.

According to the present invention, hydrazine is formed by contacting an excess of ammonia with alkyl-substituted aromatic hydrocarbon at reactive conditions. It has now been found that hydrazine can be obtained in improved yield, while avoiding the formation of corrosive or difficultly separable by-products, from a mixture of excess ammonia and alkyl-substituted aromatic hydrocarbon through a series of reactions initiated by the free radical dissociation of the alkyl substituent of the aromatic hydrocarbon. The hydrazine product is readily obtained in high purity from the products of the reactive contact by procedures such as distillation and crystallization; other components of the reaction mixture can be recycled for re-use in the reactive contact.

It is preferred to carry out the reaction by contacting ammonia with the alkyl-substituted aromatic hydrocarbon at elevated temperature, i. e. a temperature in the range of about 500° C. to 1000° C., and more preferably at about 600° C. to 800° C.

Hydrazine is produced according to this invention as an end product in a series of reactions. This reaction series is initiated by the free radical dissociation of the alkyl-substituted aromatic hydrocarbon reactant to form a hydrogen atom and an alkyl-aromatic free radical. Accordingly, it is preferred to use as alkyl-substituted aromatic hydrocarbon reactant compounds which readily undergo the desired free radical dissociation. In general, the use of alkyl-substituted aromatic hydrocarbons having shorter substituent carbon chains, i. e. less than about 4 carbon atoms in each substituent alkyl group, is preferred in practicing this invention in order to avoid cracking of the substituent alkyl group. Mono-nuclear aromatics are employed in preference to polynuclear aromatics, although it is within the scope of the invention to employ the latter. Mixtures of alkyl-substituted aromatic hydrocarbons can be used. The alkyl-substituted aromatic hydrocarbons which are most advantageously used are the methyl substituted benzenes, and of these compounds toluene is most successfully used in carrying out the present invention. Specific examples of alkyl-substituted aromatic hydrocarbons which can be used are: toluene, xylenes, pseudocumene, mesitylene, durene, ethylbenzene, propylbenzene, cumene, alpha methyl naphthalene, beta methyl naphthalene, 1,4-dimethyl naphthalene, 2,3-dimethyl naphthalene, 2,6-dimethyl naphthalene, and the like.

It is distinctly advantageous to use anhydrous ammonia rather than aqueous ammonia in carrying out this invention. Hydrazine is difficult to separate from water; highly specialized operational techniques are necessary to affect such separation. Accordingly, it is desirable to carry out this invention in the absence of water in order to avoid operational difficulties in obtaining a substantially pure hydrazine product.

The reaction series by which hydrazine is produced is initiated by the free radical dissociation of the alkyl substituent of the aromatic hydrocarbon reactant to form a hydrogen atom and an alkyl-aromatic free radical, e. g. benzyl radical where toluene is used as reactant. Both of these dissociation products are capable of reacting with ammonia to form $NH_2$ radicals. It is these $NH_2$ radicals which subsequently dimerize to form hydrazine.

In order to cause this reaction series to go to completion with the formation of substantial yields of hydrazine, it is necessary that the reaction series be carried out in the presence of an excess of ammonia. If the reactions are not carried out in excess ammonia, undesirable side reactions predominate with resulting decreases in hydrazine yield. Such undesirable side reactions are the reaction of $NH_2$ radicals with non-dissociated alkyl-substituted aromatics to form ammonia and alkyl-aromatic free radicals and subsequent dimerization of these alkyl-aromatic free radicals.

For successful practice of this invention, therefore, the proportions of reactants must be regulated such that the reaction series is carried out in the presence of an excess of ammonia whereby dimerization of $NH_2$ radicals predominates rather than the above undesirable reactions. In order to make the desired reaction proceed, it is necessary that ammonia comprise a greater mol percentage of the reaction mixture than alkyl-substituted aromatic hydrocarbons. In order to insure high product hydrazine yields, however, it is preferable to contact at reactive conditions ammonia and alkyl-substituted aromatic hydrocarbon in proportions of about 2:1 to 20:1 mols of ammonia per mol of alkyl-substituted aromatic hydrocarbon. On occasion reactant ratios outside this preferred range can advantageously be used.

Reference is now made to the accompanying drawing which illustrates in simple diagrammatic form a specific embodiment of this invention.

As shown in this drawing, toluene and ammonia are introduced itno reactor 2 through line 1. The ratio of these reactants is in the range of about 2:1 to 20:1 and more preferably about 2:1 to 10:1 mols of ammonia per mol of toluene. In reactor 2, the mixture of toluene and ammonia is subjected to reactive conditions whereby the formation of hydrazine is promoted. These reactive conditions comprise heating the ammonia-toluene mixture to a temperature in the range of 500° C. to 1000° C., and more preferably to a temperature in the range of 600° C. to 800° C. The pressure in reactor 2 is maintained in the range of about 1 to 1000 p. s. i. g. Pressures in the range of about 200 to 500 p. s. i. g. are preferred since these pressures are economically obtainable and they are efficacious in suppressing undesirable side reactions which might lessen hydrazine yields.

The desired reaction between the contact materials in reactor 2 is completed after relatively short contact time. Generally a contact time at reactive conditions of from 0.1 second to 10 minutes is preferred although contact times outside this range are operative.

The reaction mixture is removed from reactor 2 upon completion of the desired reaction therein by means of line 3 and the mixture is then rapidly cooled or quenched preferably under pressure in cooler 4 to relatively low temperature, e. g. 150° C. or lower. This quenching can be effected by indirect heat exchange or by direct contact with an inert medium such as circulating solid pebbles or by injecting into the reaction mixture a recycled portion of previously cooled reaction mixture. The rapid cooling or quenching in cooler 4 effectively suppresses possible loss of product hydrazine which otherwise might occur through dissociation of the hydrazine into $NH_2$ radicals and reaction of these radicals with other components of the reaction mixture. Improved hydrazine yields are accordingly obtained through this rapid cooling or quenching.

The quenched mixture is removed from cooler 4 and subjected to distillation and crystallization treatment for the separation of substantially pure hydrazine. This mixture generally comprises unreacted ammonia, hydrazine, toluene, hydrogen, and some dibenzyl and/or benzyl amine.

The reaction mixture is removed from cooler 4 and passed into distillation tower 6 by means of line 5. In distillation tower 6 hydrazine is separated from other components of the reaction mixture having substantially different boiling range. Ammonia and hydrogen are taken as the overhead stream from distillation tower 6. This overhead is removed from tower 6 through line 7 and it is passed to condenser 8. In condenser 8 the ammonia is liquified and separated from the hydrogen. Non-condensed hydrogen is removed by line 9 and comprises a product of the process. Non-reacted ammonia is recycled to reactor 2 through lines 10 and 11.

A distillate fraction comprising mainly hydrazine and toluene is drawn from distillation tower 6 through line 12 and passed to crystallizer 13. In crystallizer 13 this distillate fraction is cooled and substantially pure hydrazine is precipitated therefrom. Normally hydrazine precipitation will occur at temperatures below about 0° C. Crystallization temperatures in the range of about —20° C. to —80° C. are preferred. A substantially pure hydrazine product is removed from crystallizer 13 by means of line 14.

Toluene is removed from crystallizer 13 and recycled to reactor 2 through lines 15 and 11. A second distillate fraction comprising benzyl amine may be removed from distillation tower 6 by means of line 16 and recycled to reactor 2 through line 11. Benzyl amine readily dissociates to form benzyl radicals and $NH_2$ radicals at the conditions in reactor 2, and therefore the recycle benzyl amine is useful in promoting the desired reaction of this invention. A bottoms fraction comprising dibenzyl is removed from distillation tower 6 by means of line 17 and comprises a product of the process. If desired, toluene may be formed from the dibenzyl by hydrogenation and such toluene re-used in the process.

I claim:

1. The method of producing hydrazine which comprises: contacting ammonia with alkyl-substituted aromatic hydrocarbon at a temperature in the range of 500° C. to 1000° C. and at a pressure of 1 to 1000 p. s. i. g., the mol ratio of ammonia to alkyl-substituted aromatic being in the range of about 2:1 to 20:1, and separating hydrazine from the resulting reaction mixture.

2. The method according to claim 1 wherein said alkyl-substituted aromatic hydrocarbon comprises a methyl substituted benzene.

3. The method according to claim 1 wherein said alkyl-substituted aromatic hydrocarbon comprises toluene.

4. The method according to claim 1 wherein said temperature is in the range of 600° C. to 800° C.

5. The method according to claim 1 wherein said pressure is 200 to 500 p. s. i. g.

6. The method according to claim 1 wherein the contact mixture is rapidly quenched to a temperature below about 150° C. upon completion of the reactive contact.

7. The method of producing hydrazine which comprises: contacting ammonia with toluene, the mol ratio of the contact materials being in the range of 2:1 to 20:1 mols of ammonia per mol of toluene, at a temperature of 600° C. to 800° C. and a pressure of 200 to 500 p. s. i. g., and separating hydrazine from the resulting reaction mixture.

8. The method of producing hydrazine which comprises: contacting ammonia with toluene, the mol ratio of the contact materials being in the range of 2:1 to 20:1 mols of ammonia per mol of toluene, at a temperature of 600° C. to 800° C. and a pressure of 200 to 500 p. s. i. g., quenching the resulting mixture to a temperature below about 150° C. and separating hydrazine from the resulting reaction mixture.

No references cited.